United States Patent
Alleaume et al.

(10) Patent No.: US 10,241,753 B2
(45) Date of Patent: Mar. 26, 2019

(54) APPARATUS AND METHOD FOR CONTROLLING THE APPARATUS BY A USER

(71) Applicant: INTERDIGITAL CE PATENT HOLDINGS, Paris (FR)

(72) Inventors: Vincent Alleaume, Pace (FR); Caroline Baillard, Sulpice la Foret (FR); Pierrick Jouet, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 14/741,595

(22) Filed: Jun. 17, 2015

(65) Prior Publication Data

US 2015/0370319 A1    Dec. 24, 2015

(30) Foreign Application Priority Data

Jun. 20, 2014  (EP) ..................... 14305964

(51) Int. Cl.
*G06F 3/16* (2006.01)
*G06F 3/01* (2006.01)
*G06F 3/0482* (2013.01)

(52) U.S. Cl.
CPC ............. *G06F 3/167* (2013.01); *G06F 3/017* (2013.01); *G06F 3/0482* (2013.01)

(58) Field of Classification Search
CPC ......... G06F 3/167; G06F 3/017; G06F 3/0482
See application file for complete search history.

(56) References Cited

U.S. PATENT DOCUMENTS

| 5,953,541 A | 9/1999 | King et al. |
| 6,868,383 B1 | 3/2005 | Bangalore et al. |
| 6,993,486 B2 * | 1/2006 | Shimakawa ............... G06F 3/16 704/270 |

(Continued)

FOREIGN PATENT DOCUMENTS

| CN | 1648828 | 8/2005 |
| JP | 2007133884 | 5/2007 |

OTHER PUBLICATIONS

Jain et al., "Unified Multiple Media Interface for Robot Teleoperation", 2000 IEEE International Conference on Multiledia and Expo, New York, New York, USA, Jul. 30, 2000, pp. 199-202.

(Continued)

*Primary Examiner* — Patrick F Marinelli
(74) *Attorney, Agent, or Firm* — Brian J. Dorini, Esq.; Robert D. Shedd, Esq.

(57) ABSTRACT

An apparatus and a method for controlling the same by a user are suggested. The suggested apparatus comprises: a detecting unit for detecting a first event executed by a user in relation to a plurality of devices including the apparatus; a control unit for generating a second event according to the first event detected by the detecting unit; an output unit for presenting the second event to the user, wherein the control unit generates a command for executing the first event on the apparatus as a function of a response of the user to the second event detected by the detecting unit. The suggested apparatus and method are suitable to provide a second event, before executing a command corresponding to a first event from the user, for the user to confirm the intention of the first event.

12 Claims, 3 Drawing Sheets

(56) References Cited

U.S. PATENT DOCUMENTS

| | | | |
|---|---|---|---|
| 7,053,752 B2* | 5/2006 | Wang | A61B 17/00 340/3.54 |
| 7,069,215 B1 | 6/2006 | Bangalore et al. | |
| 7,747,446 B2 | 6/2010 | Blass et al. | |
| 8,959,437 B2* | 2/2015 | Morse | G11B 27/105 369/30.08 |
| 9,430,186 B2 | 8/2016 | Faaborg et al. | |
| 9,852,731 B2* | 12/2017 | Dadu | G06F 3/167 |
| 2003/0046401 A1* | 3/2003 | Abbott | G06F 9/4443 709/228 |
| 2003/0055644 A1 | 3/2003 | Johnston et al. | |
| 2005/0027534 A1 | 2/2005 | Meurs et al. | |
| 2005/0288934 A1 | 12/2005 | Omi | |
| 2006/0059535 A1* | 3/2006 | D'Avello | G06F 17/30053 725/139 |
| 2006/0069563 A1 | 3/2006 | Ju et al. | |
| 2007/0033054 A1* | 2/2007 | Snitkovskiy | G06F 3/167 704/275 |
| 2008/0012701 A1* | 1/2008 | Kass | A61B 5/0002 340/539.11 |
| 2009/0051765 A1* | 2/2009 | Moberly | H04N 7/181 348/77 |
| 2009/0204409 A1* | 8/2009 | Mozer | G10L 15/30 704/275 |
| 2010/0103106 A1* | 4/2010 | Chui | G06F 3/017 345/166 |
| 2010/0241431 A1 | 9/2010 | Weng et al. | |
| 2011/0029637 A1* | 2/2011 | Morse | G11B 27/105 709/217 |
| 2011/0095916 A1* | 4/2011 | Kass | A61B 5/0002 341/20 |
| 2012/0089392 A1* | 4/2012 | Larco | G10L 15/063 704/231 |
| 2012/0110456 A1* | 5/2012 | Larco | G06F 3/167 715/728 |
| 2012/0192117 A1 | 7/2012 | Migos et al. | |
| 2013/0174205 A1* | 7/2013 | Jacobsen | H04N 21/43637 725/81 |
| 2013/0197914 A1* | 8/2013 | Yelvington | G06F 3/167 704/275 |
| 2013/0238326 A1* | 9/2013 | Kim | G06F 3/167 704/231 |
| 2014/0007115 A1 | 1/2014 | Lu et al. | |
| 2014/0200896 A1* | 7/2014 | Lee | G06F 3/167 704/270.1 |
| 2015/0006184 A1 | 1/2015 | Marti et al. | |
| 2015/0088518 A1* | 3/2015 | Kim | G06F 3/167 704/251 |
| 2015/0254057 A1* | 9/2015 | Klein | G06F 3/167 704/275 |
| 2015/0254058 A1* | 9/2015 | Klein | G06F 3/167 704/275 |
| 2015/0370319 A1* | 12/2015 | Alleaume | G06F 3/01 345/156 |
| 2016/0077793 A1 | 3/2016 | Disano et al. | |
| 2016/0132290 A1 | 5/2016 | Raux | |
| 2016/0261425 A1* | 9/2016 | Horton | G05B 15/02 |
| 2016/0300571 A1 | 10/2016 | Foerster et al. | |
| 2017/0032784 A1* | 2/2017 | Dadu | G06F 3/167 |

OTHER PUBLICATIONS

Chen et al., "Gesture-Speech Based HMI for a Rehabilitation Robot", 1996 IEEE SOUTHEASTCON '96, Bringing Together Education, Science and Technology, Tampa, Florida, USA, Apr. 11, 1996, pp. 29-36.

Refice et al., "Automatic classification of gestures: A context-dependent approach", 2011 Federated Conference on Computer Science and Information Systems, Szczecin, Poland, Sep. 18, 2011, pp. 743-750.

Search Report dated Nov. 21, 2014.

* cited by examiner

APPARATUS AND METHOD FOR CONTROLLING THE APPARATUS BY A USER

This application claims the benefit, under 35 U.S.C. § 119 of European Patent Application No. 14305964.0, filed Jun. 20, 2014.

TECHNICAL FIELD

The present disclosure generally relates to human-machine interface (HMI). In particular, the present disclosure relates to an apparatus and a method for controlling the same by a user.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In the field of human-machine interfaces (HMI), systems which are based upon gesture recognition and/or voice recognition process recently demonstrate some nice use cases in video game applications with home consoles and navigation services on smart phones respectively. For instance, the new Microsoft console XBOX One will never be fully switched off, waiting for activation through a simple vocal switch-on command (by "Xbox on" sentence).

Following the mentioned trend, people can easily imagine that in a near future many devices at a same location (home, public transport, and so on) can accept commands from speech or gestures through audio or imaging sensors. At home for instance, it may become a usual case to have more than one product of the same type and with such capabilities to operate in close vicinity. Taking again the XBOX One as an example, it is a possible option to have two similar consoles in a close area.

In case of a usual audio/video interactivity sequence between a user in a room and one of its devices (in a same room for instance), the following functions or scenario may be needed or considered:

(1) The user wants to interact by voice or gesture with one of its close devices;

(2) The user executes the command (speech or gesture) to an expected device, which is supposed to initiate the interaction (for example, a set-up menu call of device, a media selection, and so on); and (3) A triggering command from the user may initiate interaction with more than one device without disambiguating operation, leading to a conflict and non desirable situation (for example, two close XBOX One may switch on by capturing the same speech command).

The triggering event for an interaction, that is the detection of a specific gesture or a specific voice command, may be executed not intentionally and out of the device's using context. But it should not lead to the real initialization of such interactivity session if unwanted. Some double-check procedure is expected here.

In brief, in human-machine interaction based on gesture recognition and/or voice recognition, sometimes there are several devices to be controlled in a limited area. An ambiguity problem exists since there might be difficult to determine which device is to be controlled (several devices might respond to the command at the same time).

Therefore, there is a need for a disambiguation system to allow speech/gesture controlled devices to operate in close vicinity, such as in a home place.

The above-described ambiguity problem due to vicinity was already aware of and discussed in the home entertainment system in the context of using wireless game paddles with one—or more—close console(s). Known solutions try to solve this problem by an initial (one shot) pairing process, which defines a binding between each paddle and a selected console through an interactive pairing process explicitly done by the final user (it is considered that PS3 and Wii consoles are using such approach). However these solutions are expected to be done not very often, which normally will request physical interaction of the user with the device(s) related to the pairing process and therefore finally cannot be easily extended in a daily speech/gesture multi-device control use. Moreover, in some cases a user may be apart from the device to be controlled with some distance, where a classic button-based interface cannot be applied for control.

Consequently, there remains a need to improve the disambiguation system of human-machine interface at least for systems which are based upon gesture recognition and/or voice recognition.

SUMMARY

The present disclosure describes an apparatus and a method for controlling the apparatus by a user. The suggested apparatus and method are suitable to provide a second event, before executing a command corresponding to a first event from the user, for the user to confirm the intention of the first event. Embodiments of the present invention are implemented in a system with HMI based on gesture recognition and/or voice recognition. Embodiments of the present invention improve the disambiguation system of human-machine interface for systems which are based on gesture recognition and/or voice recognition.

According to a first aspect of the present disclosure, an apparatus is suggested. The apparatus comprises: a detecting unit for detecting a first event executed by a user in relation to a plurality of devices including the apparatus; a control unit for generating a second event according to the first event detected by the detecting unit; an output unit for presenting the second event to the user, wherein the control unit generates a command for executing the first event on the apparatus as a function of a response of the user to the second event detected by the detecting unit.

In an embodiment, the detecting unit detects the first event in the form of a gesture and/or a voice.

In an embodiment, the first event is a triggering event for initiating an interactivity session between the apparatus and the user.

In an embodiment, the second event is a verification event for the user to verify an intention to initiate the interactivity session.

In an embodiment, the verification event comprises a textual message for the user to repeat orally.

In an embodiment, the verification event comprises a query in the form of text, image, audio, or video, requesting the user to perform an activity.

In an embodiment, the control unit transmits the command to components and relevant devices needed for executing the first event.

In an embodiment, the output unit presents the second event to the user in a manner determined by a form of the second event.

According to a second aspect of the present disclosure, a method for controlling an apparatus by a user is suggested. The method comprises, at the level of the apparatus: receiving a first event executed by the user in relation to a plurality of devices including the apparatus; generating a second event as a function of the triggering event; presenting the second event to the user; and executing a command corresponding to the first event on the apparatus, instead of the other devices among the plurality of devices, as a function of a response of the user to the second event.

In an embodiment, the first event is in the form of a gesture and/or a voice.

In an embodiment, the second event comprises a textual message for the user to repeat orally.

In an embodiment, the second event comprises a query in the form of text, image, audio, or video, requesting the user to perform an activity.

According to a third aspect of the present disclosure, a computer program product downloadable from a communication network and/or recorded on a medium readable by computer and/or executable by a processor is suggested. The computer program comprises program code instructions for implementing the steps of the method according to the second aspect of the disclosure.

According to a fourth aspect of the present disclosure, a non-transitory computer-readable medium comprising a computer program product recorded thereon and capable of being run by a processor is suggested. The non-transitory computer-readable medium includes program code instructions for implementing the steps of the method according to the second aspect of the disclosure.

It is to be understood that more aspects and advantages of the invention will be found in the following detailed description of the present invention.

BRIEF DESCRIPTION OF THE DRAWINGS

The accompanying drawings are included to provide further understanding of the embodiments of the invention together with the description which serves to explain the principle of the embodiments. The invention is not limited to the embodiments.

In the drawings.

DESCRIPTION OF EMBODIMENTS

An embodiment of the present invention will now be described in detail in conjunction with the drawings. In the following description, some detailed descriptions of known functions and configurations may be omitted for conciseness.

Figure 1:
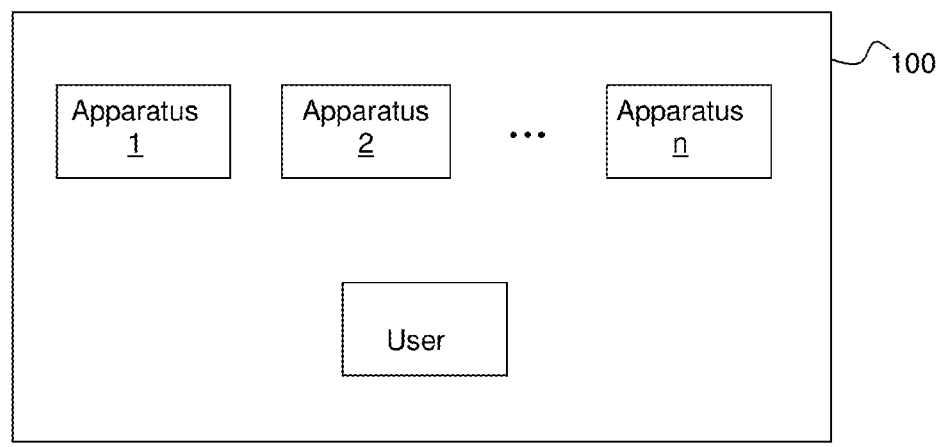
FIG. 1 illustrates an exemplary system in which the disclosure may be implemented according to an embodiment of the invention.

FIG. 1 illustrates an exemplary system 100 in which the disclosure may be implemented. The system 100 can be any kinds of HMI system based upon gesture recognition and/or voice recognition process, such as Microsoft console XBOX One, PS3 and Nintendo Wii consoles. As shown in FIG. 1, the user can interact by voice or gesture with one of the apparatus 1, 2, . . . , and n. No further details will be given to the system 100.

Figure 2:
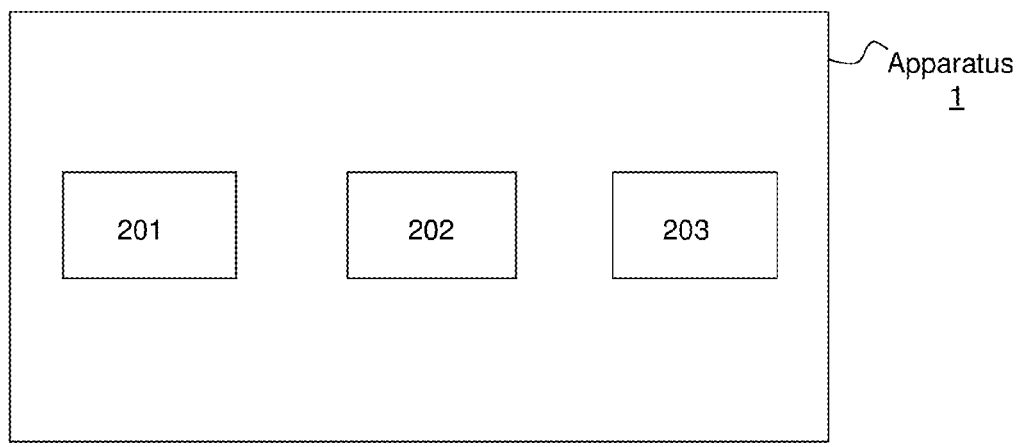
FIG. 2 is block diagram showing the structure of an apparatus in the system of FIG. 1 according to an embodiment of the invention.

FIG. 2 is block diagram showing the structure of an apparatus 1 in the system 100 according to an embodiment of the invention.

As shown in FIG. 2, the apparatus 1 comprises a detecting unit 201 for detecting a first event executed by a user in relation to the apparatus 1. The first event can be a gesture and/or a voice in various forms with which the user can interact with the apparatus 1. In one example, the first event can be a triggering event which is defined as a specific gesture and/or speech event for initiating an interactivity session between the user and the apparatus 1. Different sensors and detecting technologies can be used for the detecting unit 201. No further details will be given as it is well known to a person skilled in the art and beyond the scope of the present disclosure.

The apparatus 1 further comprises a control unit 202 for generating a second event according to the first event detected by the detecting unit 201. Every apparatus in the system 100 shown in FIG. 1 which detected the first event from the user can generate an individual second event according to the way the apparatus intends to verify the intention of the interactivity initiated by the user. For example, in the case that the first event is a triggering event for initiating an interactivity session, the second event can be a verification event for the user to verify his/her intention to initiate an interactivity session.

The second event can be in the following forms:

1) a textual message, such as a unique word, a number code, for the user to repeat orally; and 2) an elaborate query, in the form of text, image, audio, or video, requesting the user to perform an activity, such as a gesture.

For the above form 1), for example it can be a simple unique number for the user to repeat orally.

For the above form 2), for example it can be a textual query, such as "draw a circle with your hand", for the user to perform an activity, such as a gesture. It can also be a vocal query, such as "repeat the currently displayed number" for the user to perform. The query could also be in the form of a displayed image/video. For instance, a short video/animation of a gesture can be shot for the user to mimic.

It can be appreciated that other suitable forms can also be applied to the second event. No further details will be provided.

The apparatus 1 further comprises an output unit 203 for presenting the second event to the user. It can be appreciated that the second event can be presented in a suitable manner according to the form the second event. For example, if the second event is a textual message, a front panel LCD can be used for presenting the second event. A second event in the form of an elaborate query can be presented to the user on a linked-and-active TV set. If the second event is an audio query, a speaker may be needed, in which case the second event is preferably presented with a random delay to avoid an overlapping with other apparatus, if any, in the system 100.

The device for presenting the second event can be a part of the apparatus 1, or a device independent of the apparatus 1.

In an example, the output unit 203 can allow the user to set preference regarding the device for presenting the second event. For instance, if there are a LCD front display and a speaker output for the presenting, the output unit 203 can allow the user to set which one is the preference.

The user will make a correct response to the presented second event from the apparatus he/she really intends to control according to the requirement of the second event.

If the second event is a textual message displayed on front panel LCD requiring the user to read out, the user can make a response by reading out the displayed text word or code. For example, the second event can be a textual message "repeat the currently displayed number: 0011". Then the user can make a correct response by reading out the number "0011".

If the second event is an elaborate query requiring the user to make an additional gesture, the user can make the response by executing the additional gesture indicated by elaborate query. For example, the second event can be a textual query "draw a circle with your hand". Then the user can make a correct response by executing the gesture requested by the second event.

If the second event is a question to the user in the form of an audio, the user can make the response by giving an answer to the audio query.

In an example, the output unit 203 can allow a user to preferences per device regarding the type of response to be made depending on the device interaction capability. For example, the user can set that a vocal response is preferred in one case, or gestural response in other case.

The detecting unit 201 will detect the response from the user. Upon the detection of a correct response to the second event, the control unit 202 will generate a command for executing the first event and transmit the command to necessary components or devices in the system 100. In one example, the first event is a triggering event for initiating an interactivity session between the user and the apparatus 1. In this case, if a correct response to the second event is received by the detecting unit 201, the control unit 202 will switch on necessary components of the apparatus 1 to initiate an interactivity session with the user. It can be appreciated that other devices in the system 100 needed for the interactivity session will also be switched on and operated.

The other apparatus, for example, apparatus 2 to n shown in FIG. 1, which did not detect correct response or detected an invalid response after delay to their second events, will not initiate interactive sessions with the user.

Figure 3:
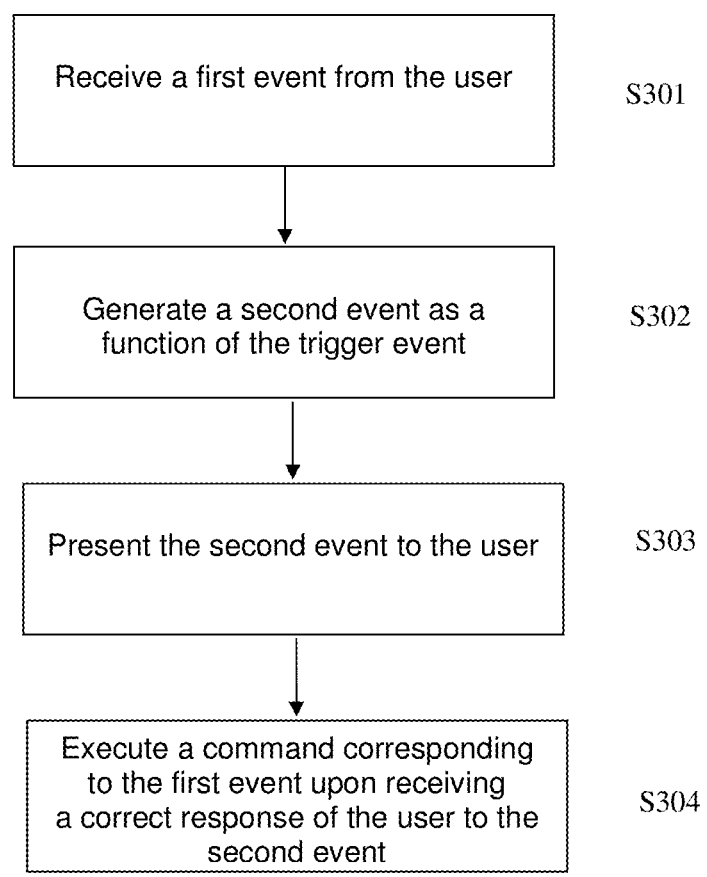
FIG. 3 is a flow chart showing a method for controlling an apparatus by a user according to an embodiment of the invention.

FIG. 3 is a flow chart showing a method for controlling an apparatus by a user according to an embodiment of the invention.

As shown in FIG. 3, the method comprises a step S301 of receiving, by the apparatus, a first event from the user.

At step S302, the apparatus generates a second event as a function of the triggering event.

At step S303, the apparatus presents the second event to the user.

At step S304, the apparatus executes a command corresponding to the first event upon receiving a correct response of the user to the second event.

EXAMPLES

Next, an example of the method according to an embodiment of the invention will be described in the context of a media device being controlled through voice commands with reference to FIG. 4.

Figure 4:
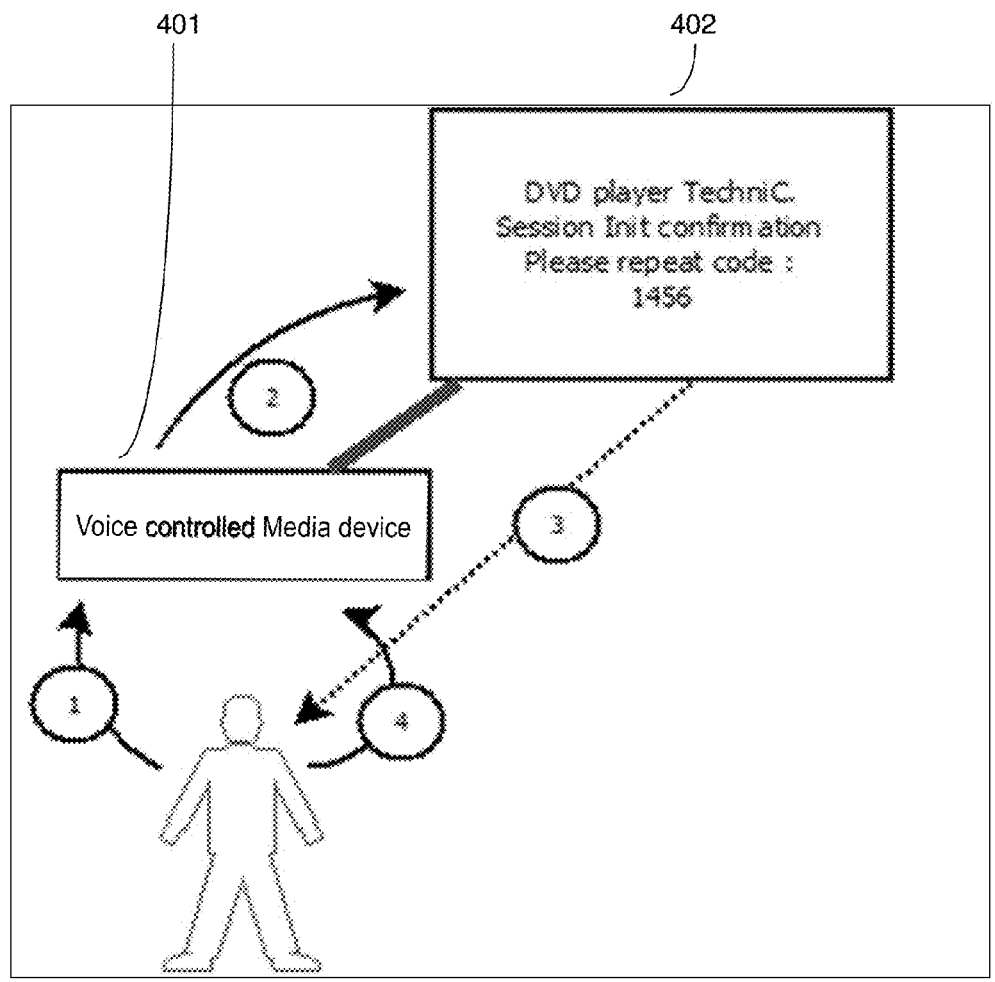
FIG. 4 illustrates an exemplary example of the method according to an embodiment of the invention implemented in the context of a media device being controlled through voice commands.

In this example, the media device 401 is equipped with a microphone such as an enhanced BluRay reader having on LCD panel display 402 and being connected to an external display (for example, a TV set) not shown in FIG. 4. In this sense, the media deice 401 is voice controlled.

The user can, at the step 1 in the FIG. 4, execute a triggering event for initiating an interactive session with the media device 401. The triggering event can be a specific word or a gesture which is considered as an activation event from the BluRay device. For instance, the triggering event is for the purpose of reading an inserted disk.

Upon the receipt of the triggering event, the media device 401 will start a disambiguation procedure to check whether the user really wants to establish the interactive session.

The disambiguation procedure comprises firstly the generation of a specific challenge query according to the received triggering event, which is shown as step 2 in FIG. 4. In this example, the challenge query is an arbitrary text code.

The arbitrary text code then is presented to the user in a suitable manner. Specifically, the arbitrary text code can be displayed on the LCD panel display 402 if the TV set is not yet active, or otherwise on the TV set, or even both, along with device information (such as device nickname, model, etc). As shown in FIG. 4, the arbitrary text code below is displayed:

DVD player TechniC.
Session Init conformation
Please repeat code:
1456

As described below, the arbitrary text code will help the user to confirm the devices with which he/she wants to start of an interactive session.

In this example, as a response to the challenge query, as the step 3 shown in FIG. 4, the user repeats the displayed code text to confirm the intention to initiate an interactive session with this media device 401.

Upon receipt of the response, at the step 4 in FIG. 4, the media device 401 executes the command corresponding to the triggering event, that is, to initiate an interactive session. For this purpose, some components of the media device 401 or devices in the system need to be involved. For example, possibly the TV set needs to be activated by Blu-ray reader, if it was in sleep mode during the disambiguation procedure which only uses LCD panel display 402.

An embodiment of the invention provides a computer program product downloadable from a communication network and/or recorded on a medium readable by computer and/or executable by a processor, comprising program code instructions for implementing the steps of the method described above.

An embodiment of the invention provides a non-transitory computer-readable medium comprising a computer program product recorded thereon and capable of being run by a processor, including program code instructions for implementing the steps of a method described above.

It is to be understood that the present invention may be implemented in various forms of hardware, software, firmware, special purpose processors, or a combination thereof. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. An apparatus, comprising
 a detecting unit for detecting a first event executed by a user in relation to a plurality of devices including the apparatus;
 a control unit generating a second event according to the first event detected by the detecting unit, said second event being specific to said apparatus;
 an output unit for presenting the second event to the user, wherein
 the control unit generates a command for executing the first event on the apparatus as a function of a response of the user to the second event detected by the detecting unit; and
 the second event comprises an audio query produced by a speaker and presented with a random delay to confirm the intention to execute the first event on the apparatus.

2. Apparatus according to claim 1, wherein the detecting unit detects the first event in the form of a gesture and/or a voice.

3. Apparatus according to claim 1, wherein the first event is a triggering event for initiating an interactivity session between the apparatus and the user.

4. Apparatus according to claim 3, wherein the second event is a verification event for the user to verify an intention to initiate the interactivity session.

5. Apparatus according to claim 1, further comprising the control unit transmits the command to components and relevant devices needed for executing the first event.

6. A method to control an apparatus by a user, comprising, at the level of the apparatus:
 receiving a first event executed by the user in relation to a plurality of devices including the apparatus;
 generating a second event according to the first event;
 presenting the second event to the user; and
 executing a command corresponding to the first event on the apparatus, as a function of a response of the user to the second event, wherein
 the second event comprises an audio query produced by a speaker and presented with a random delay to confirm the intention to execute the first event on the apparatus.

7. Method according to claim 6, wherein the first event is in the form of a gesture and/or a voice.

8. A non-transitory computer readable medium having stored thereon a computer program product comprising program code instructions executable by a processor for implementing the steps of a method according to claim 6.

9. Method according to claim 6, wherein the first event is a triggering event for initiating an interactivity session between the apparatus and the user.

10. Method according to claim 9, wherein the second event is a verification event for the user to verify an intention to initiate the interactivity session.

11. Method according to claim 6, wherein the step of executing the command comprises transmitting the command to components and relevant devices needed for executing the first event.

12. An apparatus, comprising
 a detecting unit detecting a first event executed by a user in relation to a plurality of devices including the apparatus, wherein the first event being a triggering event for initiating an interactivity session between the apparatus and the user;
 a control unit generating a second event according to the first event detected by the detecting unit; and
 an output unit presenting the second event to the user; wherein
 the second event being a verification event for the user to confirm an intention to initiate the interactivity session on the apparatus;
 the second event being individual to the apparatus according to the way the apparatus intends to verify the intention of the interactivity initiated by the user;
 the control unit generates a command for executing the first event on the apparatus, instead of the other devices among the plurality of devices, as a function of a response of the user to the second event detected by the detecting unit; and
 the second event comprises an audio query produced by a speaker and presented with a random delay.

* * * * *